(12) United States Patent
Zacarchuk

(10) Patent No.: US 9,429,321 B2
(45) Date of Patent: Aug. 30, 2016

(54) ELECTRICAL CIRCUIT FOR IGNITION SYSTEM FOR JET ENGINE

(71) Applicant: Kanfit Ltd, Migdal Haemek (IL)

(72) Inventor: Anatoly Zacarchuk, Migdal Haemek (IL)

(\*) Notice: Subject to any disclaimer, the term of this patent is extended or adjusted under 35 U.S.C. 154(b) by 157 days.

(21) Appl. No.: 14/397,651

(22) PCT Filed: May 2, 2013

(86) PCT No.: PCT/IL2013/000048
§ 371 (c)(1),
(2) Date: Oct. 29, 2014

(87) PCT Pub. No.: WO2013/164816
PCT Pub. Date: Nov. 7, 2013

(65) Prior Publication Data
US 2015/0077896 A1 Mar. 19, 2015

(30) Foreign Application Priority Data
May 3, 2012 (IL) .......................................... 219571

(51) Int. Cl.
*F23Q 3/00* (2006.01)
*F02K 9/95* (2006.01)
*F02C 7/266* (2006.01)

(52) U.S. Cl.
CPC .............. *F23Q 3/006* (2013.01); *F02C 7/266* (2013.01); *F02K 9/95* (2013.01)

(58) Field of Classification Search
CPC ............ F02C 7/266; F02K 9/95; F23Q 3/006
USPC .......................................................... 361/256
See application file for complete search history.

(56) References Cited

U.S. PATENT DOCUMENTS

| 4,839,772 A | * | 6/1989 | Choi ...................... F23Q 3/004 |
| | | | 123/604 |
| 2007/0256426 A1 | | 11/2007 | Dooley |
| 2011/0234099 A1 | | 9/2011 | Ganieeddy et al. |

OTHER PUBLICATIONS

Israeli Patent Office (ILPO) Office Action dated Feb. 1, 2015 sent during the examination of the Israeli parent patent application No. 219571 (Original documents and their translation into English are enclosed).
ILPO Notice of Deficiencies Before Allowance dated Jun. 1, 2015 (Original documents and their translation into English are enclosed).

\* cited by examiner

*Primary Examiner* — Thienvu Tran
*Assistant Examiner* — Kevin J Comber

(57) ABSTRACT

An electrical circuit for ignition system for jet engines comprises: main inverter, secondary inverter, main Diode, Secondary Diode, main capacitor, secondary capacitor, controller, main transformer, secondary transformer, transistor, wire connection to electrode and wire connections to the power source and switch.

1 Claim, 1 Drawing Sheet

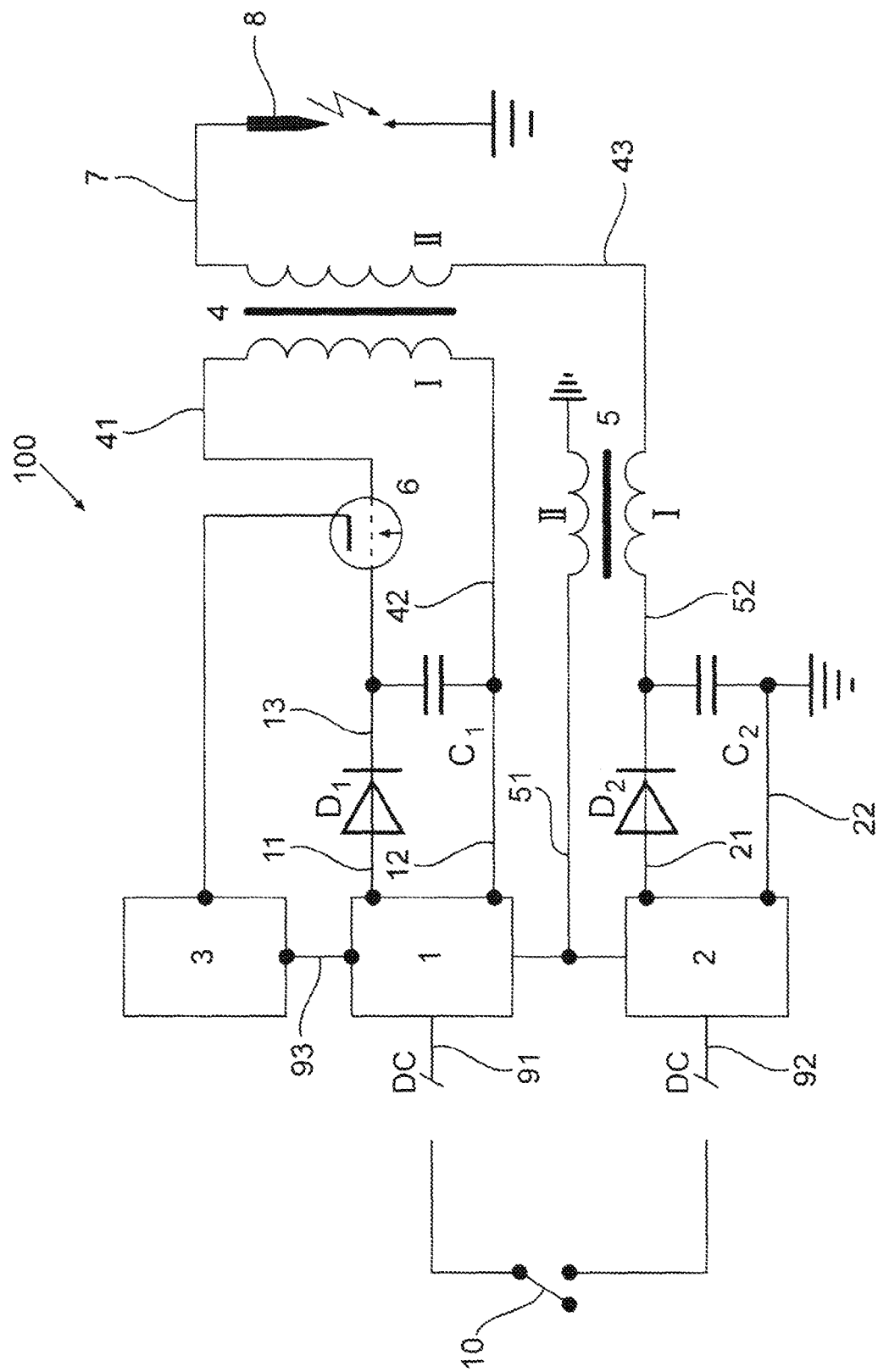

ELECTRICAL CIRCUIT FOR IGNITION SYSTEM FOR JET ENGINE

RELATED APPLICATIONS

This application is a National Phase of PCT Patent Application No. PCT/IL2013/000048 having International filing date of 2 May 2013, which claims the benefit of priority of IL Patent Application No. 219571 filed on 3 May 2012. The contents of the above applications are all incorporated by reference as if fully set forth herein in their entirety.

FIELD OF THE INVENTION

The present invention relates to an electrical circuit for an ignition system of jet engine.

BACKGROUND OF THE INVENTION

Jet engines are activated by ignition system that includes the electrode that creates a spark in the combustion chamber of the engine. Jet engines are used mainly in rockets and jet planes. As far as it is known to the inventor of the present invention it is customary nowadays to install an ignition system in jet planes, as described in principle in U.S. Pat. No. 5,587,630 (hereinafter "patent 630"). The electrical circuit of the ignition system subject matter of the present invention (hereinafter "the Electrical Circuit") has several advantageous over the electrical circuit of the ignition system subject matter of patent 630 (hereinafter "the Electrical circuit 630" Thus, due to the fact, that the Electrical Circuit comprises of less components and parts than the Electrical Circuit 630, with more ignition power and therefore it is more reliable. Also, as tar as it is known to the inventor, it is customary nowadays to install in rockets pyrotechnic ignition system, that means mechanical ignition system for single-use so in case the racket's engine is shot down then it is impossible to re-activate the engine, whereas it is possible by the ignition system subject of the present invention.

LIST OF DRAWINGS

The intention of the drawings attached to the application is not to limit the scope of the invention and its application. The drawings are intended only to illustrate the invention and they constitute only one of its many possible implementations.

FIG. 1 describes schematically the Electric Circuit (100) that includes main inverter (1), secondary inverter (2), main Diode (D1), Secondary Diode (D2), main capacitor (C1), secondary capacitor (C2), controller (3), main transformer (4), secondary transformer (5), transistor (6), wire connection (7) to the electrode (8), wire connections (91) (92) to the power source and switch (10).

THE INVENTION

The object of the present invention is to provide an electrical circuit for installing in ignition system in jet engines that relatively comprises small amount of components, with more ignition power and therefore it is more reliable.

The Electrical Circuit (100) of the ignition system subject of the present invention is described in FIG. 1. The Electric Circuit (100) comprises of the following components: main inverter (1), secondary inverter (2), main Diode (D1), Secondary Diode (D2), main capacitor (C1), secondary capacitor (C2), controller (3), main transformer (4), secondary transformer (5), transistor (6), wire connection (7) to the electrode (8), wire connections (91) (92) to the power source and switch (10).

First, we will describe in principle the components of the Electrical Circuit (100), then we will describe how they connect to each other, and finally we will describe how the Electrical Circuit (100) works.

The inverters (1) and (2): inverter is an electrical power converter that changes direct current DC into alternating current AC and by that is enable to change low current into high current. The main inverter (1) receives through wire connection 91 a direct voltage of 28 volt and inverts it into alternating voltage of 1,000 volts. The secondary inverter (2) receives through wire connection 92 a direct voltage of 28 volt and inverts it into alternating voltage of 3,500 volts.

The main Diode (D1) and the secondary Diode (D2) transfer the alternating voltage into direct voltage and by that are enable to charge the main capacitor C1 and the secondary capacitor C2 with direct voltage of 1,000 and 3,500 volts, respectively.

The main capacitor C1 and the secondary capacitor C2 are charged and store the electrical voltage that they get from the inverters (1) (2) during the work of the ignition system in which that Electrical Circuit (100) is installed, until they discharge the voltage power.

The transformers (4) and (5) transfer electric energy from one electric circuit to another one by a common magnetic field. Both transformers (4) and (5) include primary coil (I) and secondary coil (II), which creates the electric filed between them. When current streams in the primary coil (I) it causes a current stream in the secondary coil (II) and by that creates voltage in the electric circuit of the secondary coil (II). The transformers (4) and (5) cause high voltage of 10,000 up to 15,000 volts in their secondary coils (II).

The transistor (6) is opened and closed 40 times per second. When the transistor (6) is in a close position, the current that came from the main Diode D1 streams to the main capacitor C1 and charge it, and when the transistor (6) is in an open position the C1 discharge the current to the main transformer (4). The transistor (6) is controlled by the controller (3). When the current streams from the main inverter (1) to the controller (3) the transistor (6) works.

The connection of the electric circuit's (100) components:

The components of the electric circuit (100) connect to each other as it is shown in FIG. 1 and in sake of clarity we will describe it literally. The main inverter (1) connects by electric wire 91 to a power source of 28 volt. The main inverter (1) inverts the direct current DC to alternating current AC of 1,000 volt. Wire connection 11 connects with one end to the main inverter (1) and with its second end to the main Diode D1. Wire connection 12 connects with one end to the main inverter (1) and with its second end to the main capacitor C1. The voltage between the wires 11 and 12 is 1,000 volt. Wire connection 13 connects with one end to the main Diode D1 and with its second end to the other side of the main capacitor C1. Wire connection 93 connects with one end to the main inverter (1) and with its second end to the controller (3) and supplies it with electric power.

The primary coil (I) of the main transformer (4) connects in parallel connection to the main capacitor C1 by wires connections 42 and 41. The transistor (6) is connected to the wire connection 41. Wire connection 13 connects with one end to the transistor (6) and with its second end to the main capacitor C1.

Wire connection 7 connects with one end to the second coil (II) of the main transformer (4) and with its second end to the electrode (8). Wire connection 43 connects with one end to the other side of the secondary coil (II) and with its second end to the main coil (I) of the secondary transformer (5). Wire connection 52 connects with one end to the second side of the main coil (I) of the secondary transformer (5) and with its second end to the secondary Diode D2 and to the secondary capacitor C2. Wire connection 51 connects with one end to the secondary coil (II) of the secondary transformer (5) and with its second end to the main inverter (1). Wire connection 92 connects the secondary inverter (2) to a power source of 28 volts. The secondary inverter (2) changes the direct current DC to alternating current AC of 3,500 volts. Wire connection 21 connects with one end to the secondary Diode D2 and with its second end to the secondary inverter (2). Wire connection 22 connects with one end to the secondary inverter (2) and with its second end to the secondary capacitor C2. The voltage between the wires 21 and 22 is 3,500 volt.

As it was mentioned above, the wire connection 52 connects with one end to the secondary Diode D2 and the secondary capacitor C2 and with its second end to the primary coil (I) of the secondary transformer (5).

The function of the electric circuit (100): the inverters (1) and (2) get DC power voltage of 28 volts and they invert it to AC voltage of 1,000 and 3,500 volts respectively. The main inverter (1) supplies the controller (3) with an electrical power and the controller (3) activates the transistor (6) in a rhythm of 40 times per second. The main inverter (1) supplies DC voltage to the main Diode D1, it changes it to DC voltage and charges the main capacitor C1. The secondary inverter (2) supplies DC voltage to the secondary Diode D2, it changes it to DC voltage and charges the secondary capacitor C2. When the transistor (6) is in a close position, the capacitors C1 and C2 are charged and when it is in an open position the main capacitor C1 discharge and causes a voltage of 1,000 volts in the primary coil (I) of the main transformer (4) which consequently causes a voltage of 10,000 in the secondary coil (II) of the main transformer (4) and by that supplies the electrode (8) with high voltage.

The secondary capacitor C2 discharge simultaneously with the creation of the spark and it provides the majority of the energy for the spark. When the secondary capacitor C2 discharge, it creates an electric power in secondary transformer (5) and consequently causes a current in the wire 51 which streams to the inverters (1) and (2) and this current causes disconnection of the inverters from the electric circuit, and thus protect them from electrical short.

The invention can be implemented with different voltage measures, currents and components parameters as they were described in the application. These parameters are given only as an illustration and recommendation. It goes without saying that the parameters of the components should be fitted to the relevant voltage and currents.

The electric circuit (100) subject matter of the present invention fits to jet engines, gas engines like those which installed in vehicles and VANKEL engines. The expression "jet engine" in the application and the claims refers to all those engines.

The invention claimed is:

1. An electrical circuit for ignition system for jet engines comprises: main inverter, secondary inverter, main diode, secondary diode, main capacitor, secondary capacitor, controller, main transformer, secondary transformer, transistor, wire connection to electrode and wire connections to a power source and switch; wherein the inverters connect by the switch to a DC voltage source and change a DC voltage to AC high voltage; wherein the main inverter and the main capacitor are connected in parallel; wherein the main diode and the transistor are installed on a wire that connects the main inverter with the main capacitor; wherein the main capacitor and the main transformer are connected in parallel; wherein the secondary inverter and the secondary capacitor are connected in parallel; wherein the secondary diode is installed on a wire that connects the secondary inverter with the secondary capacitor; wherein one side of the secondary capacitor is connected to a primary coil of the secondary transformer; wherein a secondary coil of the secondary transformer is connected to the main inverter and to the secondary inverter; wherein the main inverter is connected to the controller; wherein the controller is connected to the transistor and activates the transistor; wherein a secondary coil of the main transformer is connected to the electrode; and wherein the primary coil of the secondary transformer is connected in series to the secondary coil of the main transformer.

* * * * *